UNITED STATES PATENT OFFICE.

KURT DESAMARI, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

1,059,599.  Specification of Letters Patent.  Patented Apr. 22, 1913.

No Drawing.  Application filed April 9, 1912.  Serial No. 689,631.

*To all whom it may concern:*

Be it known that I, KURT DESAMARI, doctor of technical arts, chemist, citizen of the German Empire, residing at Elberfeld, Germany, have invented new and useful Improvements in Azo Dye, of which the following is a specification.

My invention relates to the manufacture and production of a new azo color which is prepared by the combination of the diazo compound of para-chloro-ortho-nitranilin with aceto-acetic-acid-ortho-chloro-anilid ($CH_3$—$CO$—$CH_2$—$CONH$—$C_6H_4$—$Cl$). It is after being dried and pulverized a yellow powder insoluble in water, soluble in concentrated sulfuric acid with a golden yellow coloration, it melts at 250° C. and yields upon reduction with stannous chlorid and hydrochloric acid chlo-ortho-phenylendiamin.

It has the following graphically represented formula:

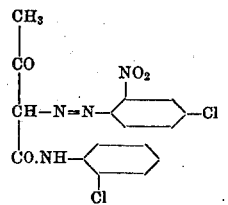

The lakes prepared from this dye are of a pure brilliant greenish-yellow distinguished by their fastness to light.

In order to illustrate the new process more fully the following examples are given, the parts being by weight:—

1. 172,5 parts of para-chloro-ortho-nitranilin are diazotized and sodium acetate is added to the resulting diazo solution to neutralize the free mineral acid. The diazo compound is then poured into an aqueous suspension of 211,5 parts of aceto-acetic-acid-ortho-chloro-anilid containing 750 parts of a 20 per cent. sodium acetate solution and the dye is filtered off and dried.

2. Mix intimately 100 parts of a finely ground heavy spar with a solution of 20 parts of aluminum sulfate in 1200 parts of hot water and add thereto a boiling suspension of 6 parts of azo dye obtained according to the first example in 1000 parts of water containing 10 parts of anhydrous sodium carbonate, boil the mixture and add to it while it is being stirred a hot solution of 30 parts of crystallized $BaCl_2$ in 300 parts of water. Boil, filter off and wash. The color of this lake is greenish-yellow.

The lakes and the coloring matter can also be produced in one operation.

I claim:—

The new dyestuff derivable from diazotized para-chloro-ortho-nitranilin and aceto-acetic-acid-ortho-chloro-anilid having the following graphically represented formula:

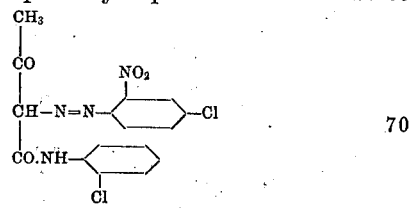

which is after being dried and pulverized a powder insoluble in water, soluble in concentrated sulfuric acid with a golden yellow color; when in a pure state melting at 250° C.; yielding upon reduction with stannous chlorid and hydrochloric acid chloro-ortho-phenylendiamin; and furnishing valuable color lakes, substantially as described.

In testimony whereof I have hereunto set my hand in the presence of two subscribing witnesses.

KURT DESAMARI. [L. S.]

Witnesses:
 HELEN NUFER,
 ALBERT NUFER.